United States Patent
Bales et al.

(10) Patent No.: US 10,808,542 B2
(45) Date of Patent: Oct. 20, 2020

(54) METHOD OF FORMING GAS TURBINE ENGINE COMPONENTS

(71) Applicant: United Technologies Corporation, Farmington, CT (US)

(72) Inventors: Daniel A. Bales, Avon, CT (US); Thomas DeMichael, Stafford Springs, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 152 days.

(21) Appl. No.: 16/245,383

(22) Filed: Jan. 11, 2019

(65) Prior Publication Data

US 2020/0224537 A1  Jul. 16, 2020

(51) Int. Cl.
| | | |
|---|---|---|
| *B23K 101/00* | (2006.01) | |
| *F01D 5/14* | (2006.01) | |
| *B23K 35/38* | (2006.01) | |
| *B23K 37/00* | (2006.01) | |
| *B23K 37/04* | (2006.01) | |

(52) U.S. Cl.
CPC ............ *F01D 5/147* (2013.01); *B23K 35/383* (2013.01); *B23K 37/003* (2013.01); *B23K 37/04* (2013.01); *B23K 2101/001* (2018.08); *F05D 2230/232* (2013.01); *F05D 2230/40* (2013.01); *F05D 2230/64* (2013.01); *F05D 2240/30* (2013.01)

(58) Field of Classification Search
CPC ... F01D 5/147; F01D 5/16; F01D 5/18; B23K 35/383; B23K 37/003; B23K 37/04; B23K 2101/001; F05D 2230/232; F05D 2230/40; F05D 2230/64; F05D 2240/30; F05D 2220/36; B21D 22/022; B21D 11/20; B21D 37/16; B21D 53/78; B23P 15/04
See application file for complete search history.

(56) References Cited

U.S. PATENT DOCUMENTS

| | | |
|---|---|---|
| 4,188,811 A | 2/1980 | Brimm |
| 5,063,662 A | 11/1991 | Porter et al. |
| 5,269,058 A | 12/1993 | Wiggs et al. |
| 5,896,658 A * | 4/1999 | Calle ..................... B21D 26/021 29/889.7 |
| 7,237,709 B2 | 7/2007 | Beckford |
| (Continued) | | |

FOREIGN PATENT DOCUMENTS

GB      2073631      10/1981

*Primary Examiner* — Lee A Holly
(74) *Attorney, Agent, or Firm* — Carlson., Gaskey & Olds, P.C.

(57) ABSTRACT

A method of forming a gas turbine engine component according to an example of the present disclosure includes, among other things, attaching a cover skin to an airfoil body, the airfoil body and the cover skin cooperating to define pressure and suction sides of an airfoil, and moving the airfoil in a forming line including a plurality of stations. The plurality of stations include a set of heating stations, a deforming station and a set of cool down stations. The moving step includes positioning the airfoil in the set of heating stations to progressively increase a temperature of the airfoil, then positioning the airfoil in the deforming station including causing the airfoil to deform between first and second dies, and then positioning the airfoil in the set of cool down stations to progressively decrease the temperature of the airfoil.

20 Claims, 8 Drawing Sheets

(56) References Cited

U.S. PATENT DOCUMENTS

| | | |
|---|---|---|
| 7,993,105 B2 | 8/2011 | Weisse et al. |
| 8,205,476 B2 | 6/2012 | Voice |
| 8,256,118 B2 | 9/2012 | Cammer |
| 9,010,166 B2 | 4/2015 | Brennand |
| 9,790,800 B2 | 10/2017 | Quigley |
| 2018/0318966 A1 | 11/2018 | Evans et al. |

* cited by examiner

METHOD OF FORMING GAS TURBINE ENGINE COMPONENTS

BACKGROUND

This disclosure relates to a gas turbine engine, and more particularly to forming gas turbine engine components including airfoils.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fans include hollow fan blades made of a metallic or composite material. Various techniques can be utilized to construct hollow fan blades, including attaching a cover skin to an airfoil body.

SUMMARY

A method of forming a gas turbine engine component according to an example of the present disclosure includes attaching a cover skin to an airfoil body, the airfoil body and the cover skin cooperating to define pressure and suction sides of an airfoil, and moving the airfoil in a forming line including a plurality of stations. The plurality of stations include a set of heating stations, a deforming station and a set of cool down stations. The moving step includes positioning the airfoil in the set of heating stations to progressively increase a temperature of the airfoil, then positioning the airfoil in the deforming station including causing the airfoil to deform between first and second dies, and then positioning the airfoil in the set of cool down stations to progressively decrease the temperature of the airfoil.

In a further embodiment of any of the foregoing embodiments, the airfoil is a fan blade.

In a further embodiment of any of the foregoing embodiments, the airfoil is metallic.

In a further embodiment of any of the foregoing embodiments, each heating station of the set of heating stations includes one or more infrared heating elements.

In a further embodiment of any of the foregoing embodiments, the set of heating stations includes two or more heating stations arranged in series.

In a further embodiment of any of the foregoing embodiments, the temperature of the airfoil in at least one heating station of the set of heating stations is greater than a temperature of the first and second dies.

In a further embodiment of any of the foregoing embodiments, the forming line includes a loading station upstream of the set of heating stations, and the method further includes positioning the airfoil in the loading station at a loading temperature between 50 degrees and 150 degrees Fahrenheit.

In a further embodiment of any of the foregoing embodiments, the step of positioning the airfoil in the deforming station includes moving the first and second dies towards and into abutment with respective ones of the pressure and suction sides.

In a further embodiment of any of the foregoing embodiments, the step of positioning the airfoil in the deforming station includes heating the first and second dies to a temperature of at least 1200 degrees Fahrenheit.

In a further embodiment of any of the foregoing embodiments, the airfoil body extends from a root section to a tip portion. The tip portion defines a stagger angle relative to the root section, and the stagger angle is greater than or equal to 10 degrees, absolute, prior to the attaching step.

In a further embodiment of any of the foregoing embodiments, the step of causing the airfoil to deform occurs such that a change in the stagger angle of the airfoil presented to the deforming station is no more than 2 degrees, absolute.

In a further embodiment of any of the foregoing embodiments, the attaching step includes welding at least a perimeter of the cover skin to the airfoil body.

In a further embodiment of any of the foregoing embodiments, the cover skin is dimensioned to enclose at least one internal cavity in the airfoil body, and the attaching step includes trapping an inert gas in the at least one internal cavity.

In a further embodiment of any of the foregoing embodiments, the inert gas comprises argon.

In a further embodiment of any of the foregoing embodiments, the airfoil includes a plurality of airfoils, and the moving step includes moving the plurality of airfoils together as an airfoil set in each of the plurality of stations.

A further embodiment of any of the foregoing embodiments includes positioning the airfoil set in a common support fixture, and wherein the moving step includes moving the common support fixture together with the airfoil set in the plurality of stations.

A method of forming a gas turbine engine component according to an example of the present disclosure includes welding a cover skin to an airfoil body to define an airfoil, the airfoil body extending from a root section to a tip portion to define a stagger angle such that the airfoil body is twisted, and moving the airfoil in a forming line subsequent to the welding step. The forming line includes a set of heating stations and a deforming station. The moving step includes positioning the airfoil in the set of heating stations to progressively increase a temperature of the airfoil, and then positioning the airfoil in the deforming station including causing the airfoil to deform between first and second dies.

In a further embodiment of any of the foregoing embodiments, the airfoil body extends from a root section to a tip portion, the tip portion defines a stagger angle relative to the root section, and the stagger angle is greater than or equal to 10 degrees, absolute, prior to the welding step. The step of causing the airfoil to deform between the first and second dies occurs such that a change in the stagger angle of the airfoil presented to the deforming station is no more than 1 degree, absolute.

A further embodiment of any of the foregoing embodiments includes forming a plurality of internal cavities in the airfoil body. The welding step includes trapping an inert gas in the plurality of internal cavities.

In a further embodiment of any of the foregoing embodiments, the forming line includes a set of cool down stations. The moving step includes positioning the airfoil in the set of cool down stations to progressively decrease the temperature of the airfoil subsequent to the step of positioning the airfoil in the deforming station.

The various features and advantages of this disclosure will become apparent to those skilled in the art from the following detailed description. The drawings that accompany the detailed description can be briefly described as follows.

DETAILED DESCRIPTION

Figure 1:
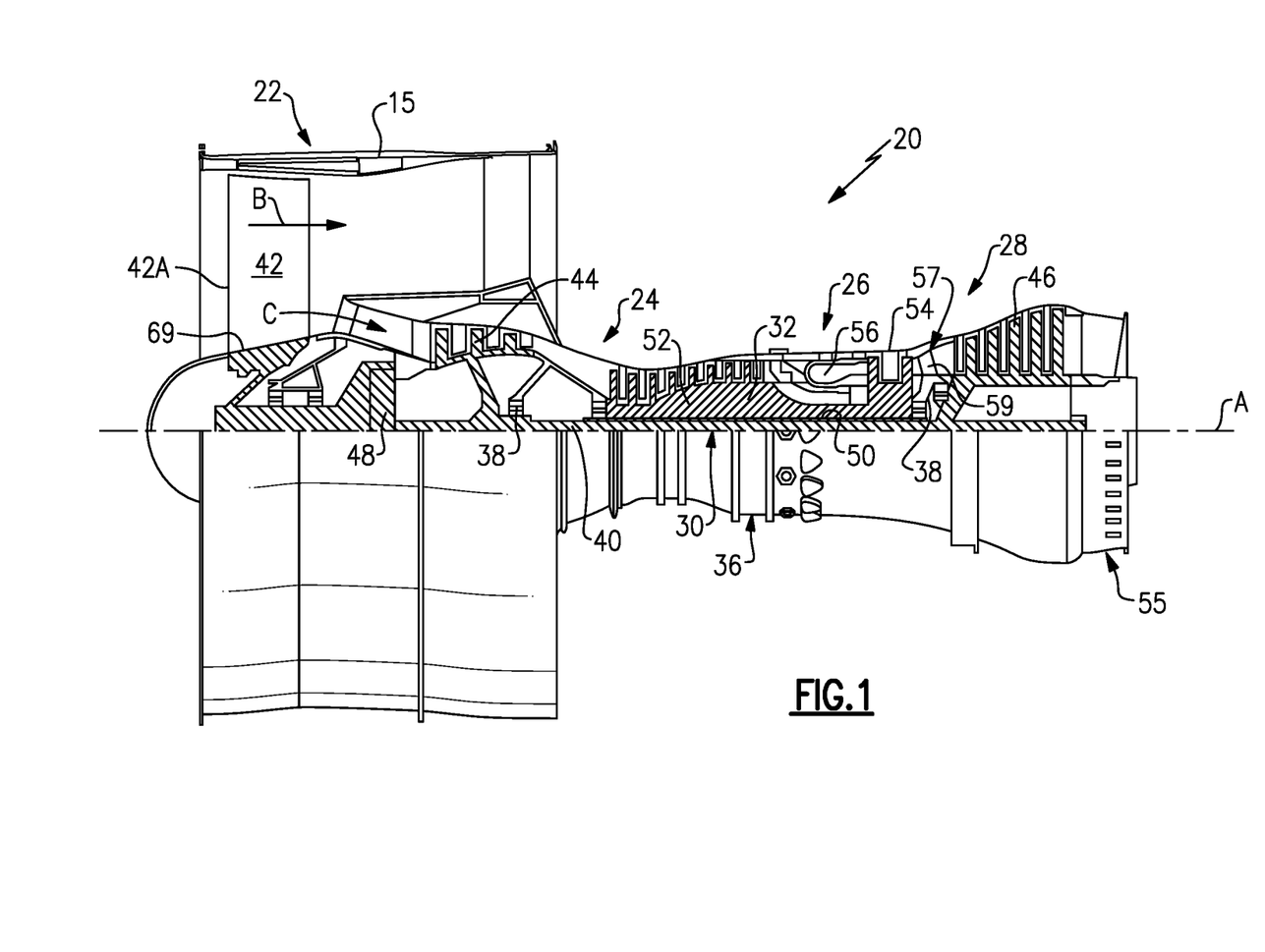
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
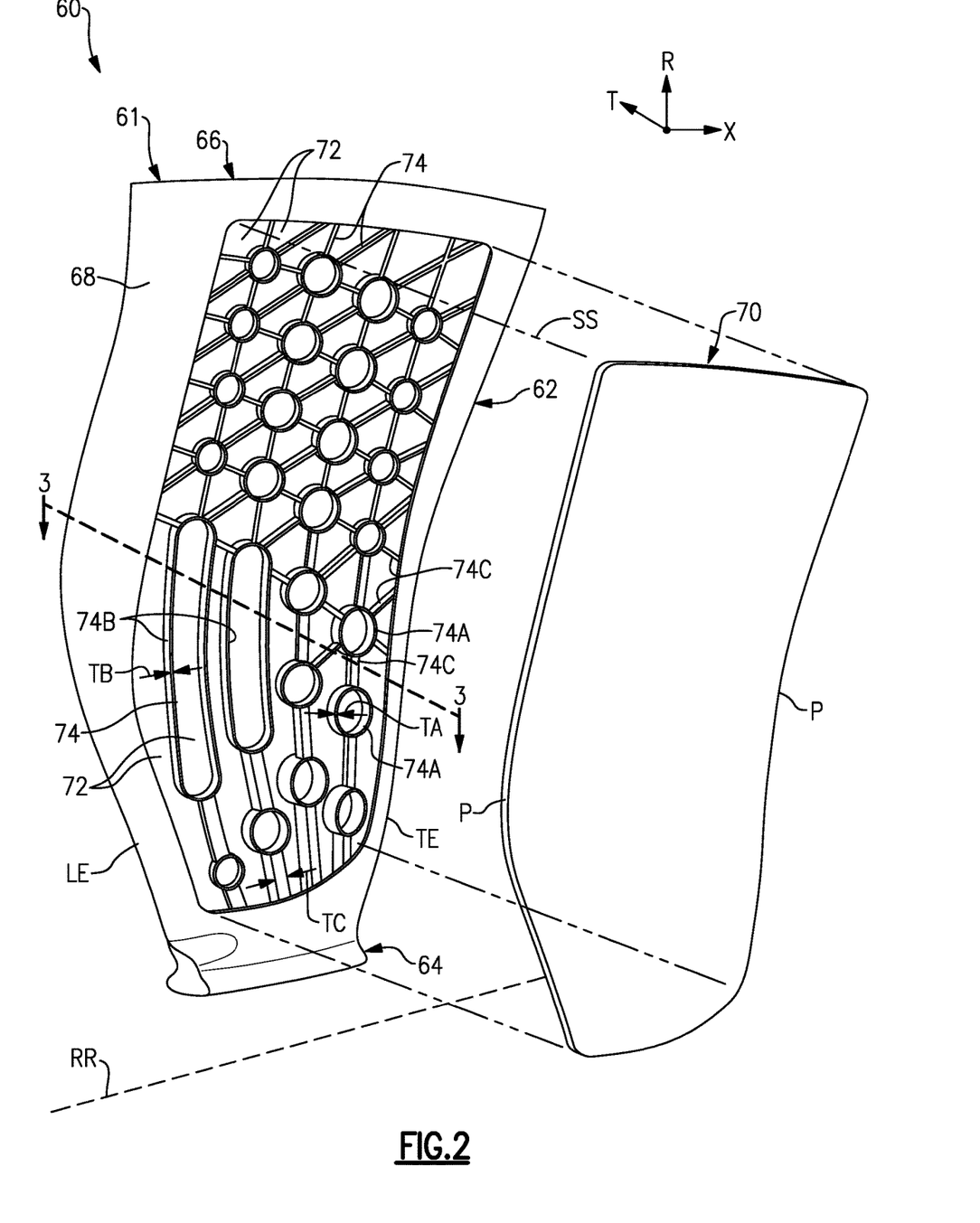
FIG. 2 illustrates a perspective view of an airfoil.

FIG. 2 illustrates a gas turbine engine component 60 according to an example. The component 60 can be incorporated in the gas turbine engine 20 of FIG. 1, for example. In the illustrated example of FIG. 2, the component 60 is an airfoil 61. The airfoil 61 can be a fan blade 42A for the fan 42 of FIG. 1, for example. Other types of airfoils, including blades, vanes and struts in the fan, compressor and turbine sections 22, 24, 28, mid-turbine frame 57 and turbine exhaust case (TEC) 55 (FIG. 1) may benefit from the examples disclosed herein which are not limited to the design shown. Other parts of the gas turbine engine 20 may benefit from the examples disclosed herein, including industrial turbines.

Figure 3:
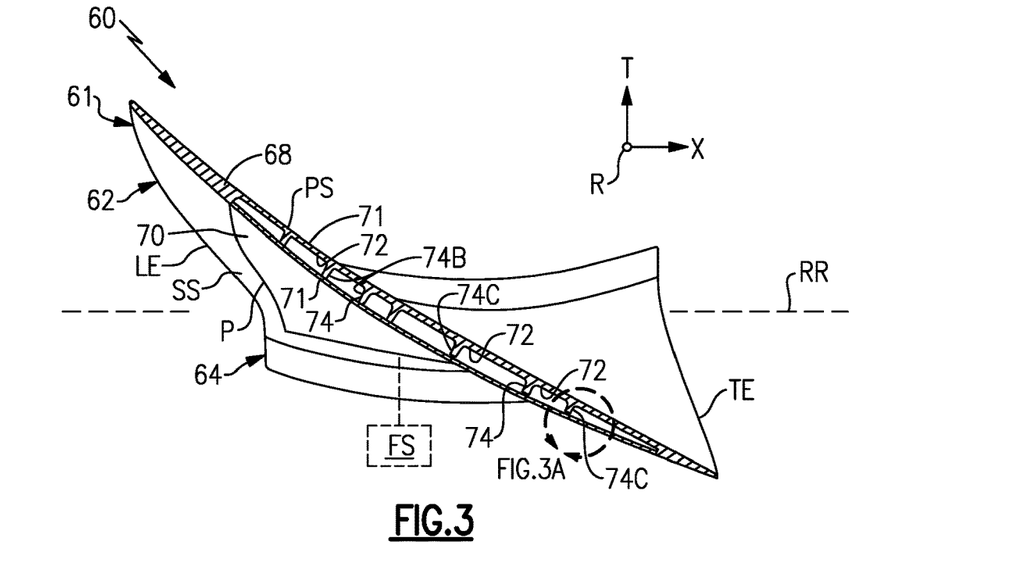
FIG. 3 illustrates a section view of the airfoil taken along line 3-3 of FIG. 2.

The airfoil 61 includes an airfoil section 62 extending in a spanwise or radial direction R from a root section 64. The root section 64 is a shape that is configured to mount the fan blade 42A in the engine 20, such as a dovetail shape. Generally, one side of the airfoil section 62 is a suction side SS and the other side is a pressure side PS (FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour of the airfoil section 62, as illustrated in FIG. 3. The airfoil 61 is rotatable about an axis of rotation RR. The axis of rotation RR can be collinear or parallel to the engine axis A (FIG. 1).

The airfoil section 62 includes a first skin or airfoil body 68 that extends in the radial direction R from the root section 64 to a tip portion 66 (FIG. 3). The tip portion 66 is a terminal end of the airfoil 61. The airfoil body 68 extends in a chordwise direction X between a leading edge LE and a trailing edge TE. The airfoil body 68 defines at least one of the pressure and suction sides PS, SS. In the illustrated example of FIGS. 2 and 3, the airfoil body 68 defines both the pressure and suction sides PS, SS.

The airfoil 61 includes a cover (or second) skin 70 disposed on a surface of the airfoil body 68 and is arranged to provide a continuous surface with the suction side SS of the airfoil 61, as illustrated by FIG. 3. In another example, the cover skin 70 is disposed on the pressure side PS of the airfoil 61. The cover skin 70 is shown in an uninstalled position in FIG. 2 for illustrative purposes. The component 60 can include two or more cover skins along each of the pressure and/or suction sides PS, SS of the airfoil section 62.

The airfoil body 68 and cover skin 70 can be made out of metallic materials such as titanium or aluminum. Other materials for the airfoil body 68 and cover skin 70 can be utilized, including metals or alloys and metal matrix composites.

Referring to FIG. 3 with continuing reference to FIG. 2, the airfoil 61 includes at least one internal cavity 72 defined in the airfoil section 62. In other examples, the internal cavities 72 are omitted such that the airfoil section 62 is substantially or completely solid. In the illustrative example of FIG. 3, the airfoil body 68 includes one or more ribs 74 that define a plurality of internal cavities 72. The airfoil 61 can include fewer or more than three internal cavities 72, such as only one internal cavity 72. Each internal cavity 72 can be defined having different dimensions, shapes and at other orientations than illustrated by FIGS. 2 and 3. The internal cavities 72 can substantially or completely free of any material such that the airfoil section 62 is hollow.

Figure 3A:
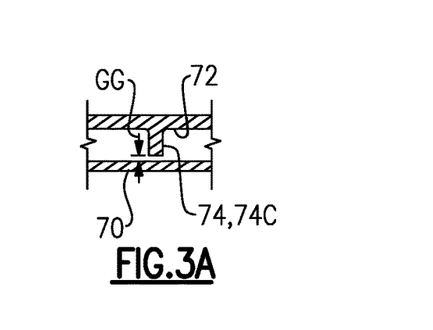
FIG. 3A illustrates selected portions of the airfoil of FIG. 3.

In the illustrated example of FIG. 2, ribs 74A have a generally circular or otherwise elliptical geometry, ribs 74B have generally elongated, oblong or racetrack shaped geometry, and ribs 74C are generally linear or curvilinear. Ribs 74A, 74B and 74C have a thickness TA, TB and TC, respectively. In examples, thicknesses TA, TB are greater than or equal to about 0.03 inches and less than or equal to about 0.125 inches, or more narrowly between 0.06 and 0.09 inches. Thickness TC can be greater than thicknesses TA, TB, such as between 0.25 and 0.625 inches, for example. Ribs 74A, 74B can be attached to the cover skin 70 utilizing any of the techniques disclosed herein, including laser or electron beam welding, brazing, diffusion bonding or other fastening techniques. At least some of the ribs 74 can be spaced apart from the cover skin 70 to define a gap GG when in an assembled position, as illustrated by rib 74C of FIG. 3A.

Walls 71 of the component 60 bound the internal cavities 72. The walls 71 can be internal or external walls of the component 60. The airfoil body 68 and cover skin 70 define one or more of the walls 71. The cover skin 70 is attached to the airfoil body 68 to enclose or otherwise bound the internal cavities 72, with the airfoil body 68 and cover skin 70 cooperating to define the pressure and suction sides PS, SS of the airfoil section 62.

Figure 4:
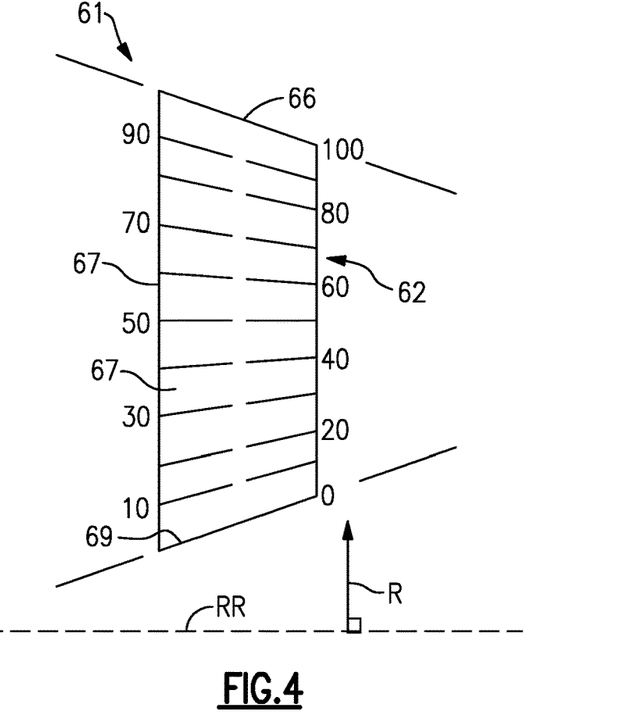
FIG. 4 is a schematic view of airfoil span positions.

Referring to FIG. 4, span positions of the airfoil section 62 are schematically illustrated from 0% to 100% in 10% increments to define a plurality of sections 67. Each section 67 at a given span position is provided by a conical cut that corresponds to the shape of segments a flowpath (e.g., bypass flowpath B or core flow path C of FIG. 1), as shown by the large dashed lines. In the case of an airfoil 61 such as with an integral platform 69, the 0% span position corresponds to the radially innermost location where the airfoil section 62 meets the fillet joining the airfoil 61 to the platform 69 (see also FIG. 1 illustrating platform 69). In the case of an airfoil 61 without an integral platform, the 0% span position corresponds to the radially innermost location where the discrete platform 69 meets the exterior surface of the airfoil section 62. A 100% span position corresponds to a section of the airfoil section 62 at the tip portion 66.

Figure 5:
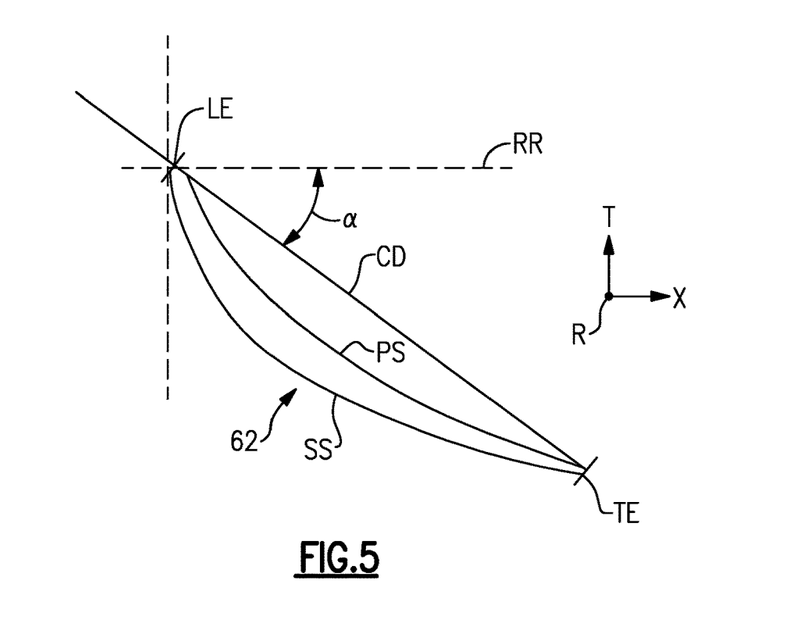
FIG. 5 is a schematic view of an airfoil depicting a stagger angle at a span position of FIG. 4.

Referring to FIG. 5 with continuing reference to FIG. 4, the airfoil section 62 is sectioned at a radial position between the root section 64 and tip portion 66. In examples, each airfoil section 62 is specifically twisted about a spanwise axis in the radial direction R with a corresponding stagger angle $\alpha$ at each span position. Chord CD, which is a length between the leading and trailing edges LE, TE, forms stagger angle $\alpha$ relative to the chordwise direction X or a plane parallel to the axis or rotation RR. The stagger angle $\alpha$ can vary along the span of the airfoil section 62 to define a twist. For example, the tip portion 66 can define a stagger angle $\alpha$ relative to the root section 64 that is greater than or equal to 5 degrees or 10 degrees, absolute. In some examples, the stagger angle $\alpha$ at the tip portion 66 relative to the root section 64 is between 5-60 degrees, absolute, or more narrowly between 10-30 degrees, absolute, such that the airfoil section 62 is twisted about a spanwise axis as illustrated by the airfoil 61 of FIGS. 2 and 3. The airfoil section 62 can be three-dimensionally twisted about the spanwise axis.

Figure 6:
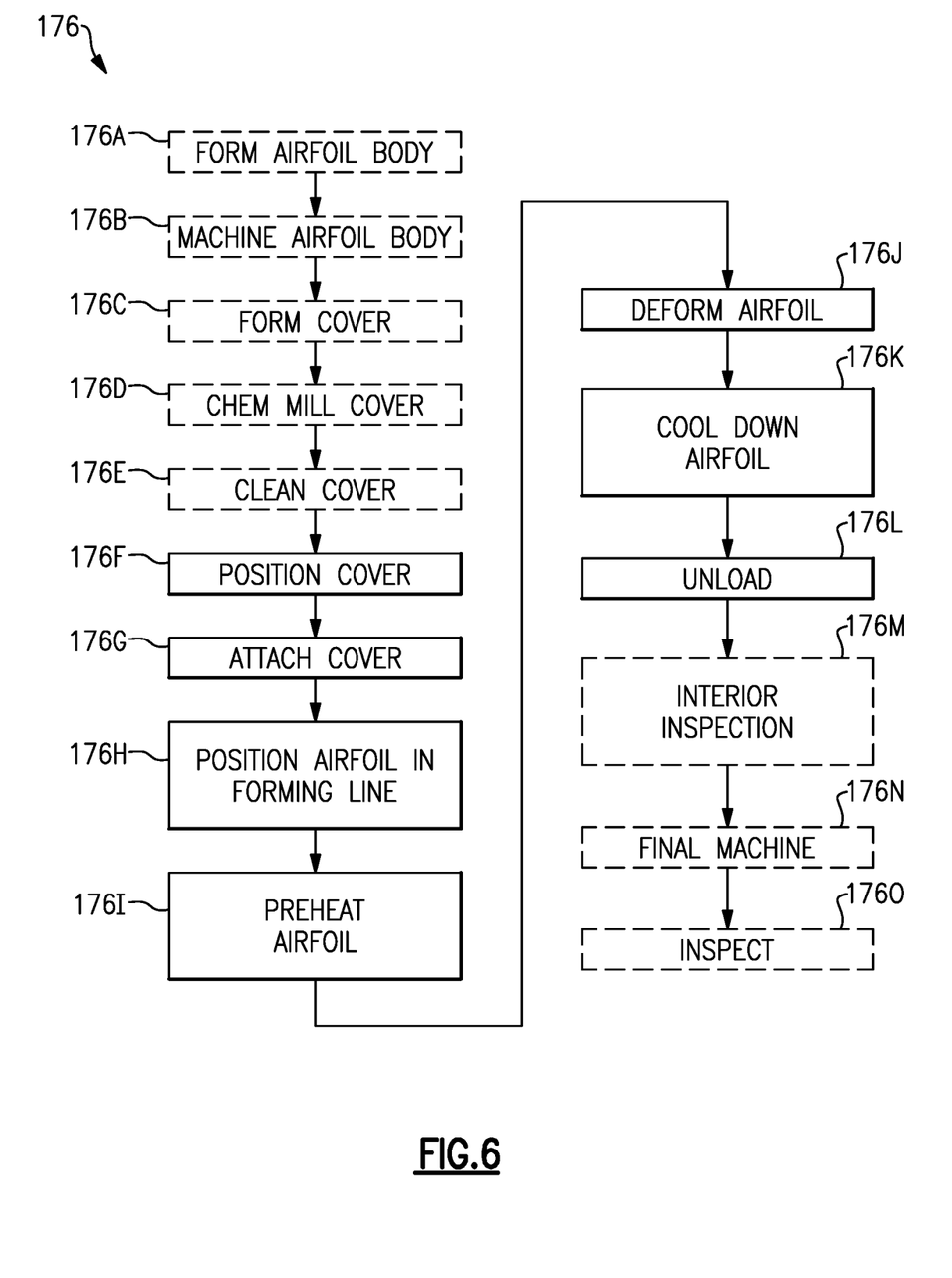
FIG. 6 illustrates a process for forming a gas turbine engine component.

FIG. 6 illustrates a process of constructing or forming a gas turbine engine component in a flow chart 176. The process can be utilized to form the component 60 of FIGS. 2 and 3, including an airfoil 61 such as fan blade 42A, another hollow airfoil, or a solid airfoil, for example. In this disclosure, like reference numerals designate like elements where appropriate and reference numerals with the addition of one-hundred or multiples thereof designate modified elements that are understood to incorporate the same features and benefits of the corresponding original elements. Reference is made to component 160 of FIGS. 7-11 for illustrative purposes, which disclose exemplary conditions or states of the component 160 in the process 176. In the illustrative example of FIGS. 7-11, the component 160 is a hollow airfoil 161 or fan blade including a metallic airfoil section 162. The techniques disclosed herein can be utilized to form a new component or to repair a previously fielded component.

Figure 7:
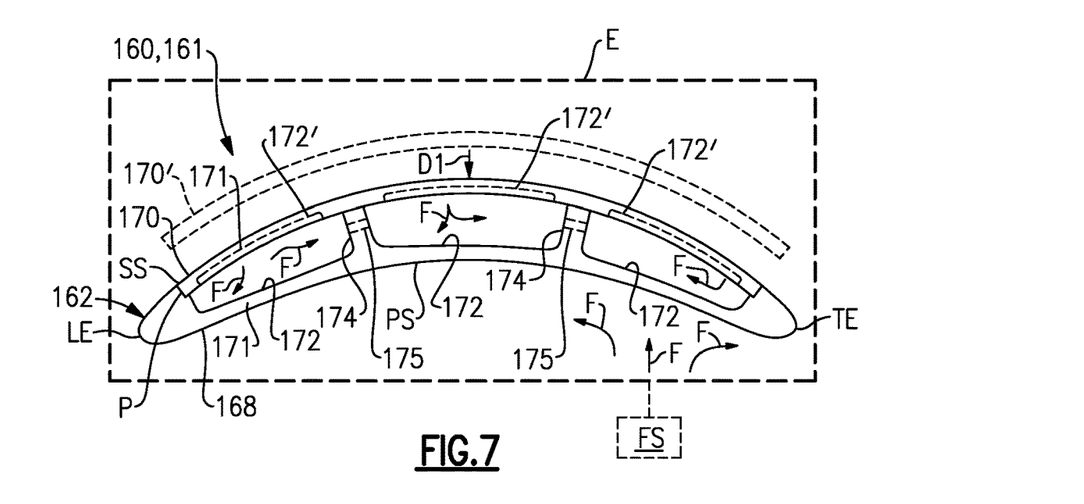
FIG. 7 illustrates attachment of portions of a gas turbine engine component.

Referring to FIGS. 6 and 7, one or more portions of the component 160 can be prepared or otherwise provided at steps 176A-176E (shown in dashed lines). The component 160 includes a first skin or airfoil/main body 168 and a cover (or second) skin 170 that define one or more walls 171 of the component 160.

At step 176A, airfoil body 168 is formed with respect to a predefined blade geometry, which can be defined with respect to one or more design criteria. The airfoil body 168 can be forged, cast, or produced by additive manufacturing from a metal or metal alloy, for example. At step 176B, internal and/or external surfaces of the airfoil body 168 are machined with respect to the predefined blade geometry. At step 176C, cover skin 170 is hot formed with respect to a predefined cover geometry. The cover skin 170 can be formed from sheet metal, for example. Airfoil body 168 and cover skin 170 can be machined and hot formed, respectively, to a configuration that compensates for weld distortion such that upon entering deform machine 190 no more than a 1 or 2 degree change in the stagger angle α is required or otherwise occurs. At step 176D, the cover skin 170 is chemically milled with respect to the predefined cover geometry. At step 176E, the cover skin 170 is cleaned to remove surface contaminants using a laser cleaning technique, for example.

One or more internal cavities 172 are formed in the airfoil body 168 and/or the cover skin 170 (internal cavities 172' defined in cover skin 170 shown in dashed lines for illustrative purposes). Ribs 174 can be arranged to define various geometries of the internal cavities 172, including any of the geometries of ribs 74 of FIG. 2.

Various techniques can be utilized to form the internal cavities 172, including casting, machining or additive manufacturing techniques. The internal cavities 172 can be defined in the airfoil body 168 and/or cover skin 170 during steps 176A-176C, for example. The cover skin 170 is dimensioned to enclose at least one, or more than one, internal cavity 172 in the airfoil body 168 when in an installed position.

At step 176F, cover skin 170' is positioned relative to the airfoil body 168. Cover skin 170' is shown in dashed lines in FIG. 7 at a distance away from the airfoil body 168 for illustrative purposes. The positioning can include moving the cover skin 170' in a direction DA and into abutment with ribs 174 of the airfoil body 168 to define a pre-finished state of the airfoil section 162, as illustrated by cover skin 170.

At step 176G, the cover skin 170 is attached to the airfoil body 168 to define the airfoil 161. In examples, a perimeter P (see also FIGS. 2-3) of the cover skin 170 and/or locations of the cover skin 170 abutting the ribs 174 are attached to the airfoil body 168 to enclose or otherwise bound the internal cavities 172. Various techniques can be utilized to attach the cover skin 170 to the airfoil body 168, including laser or electron beam welding, brazing, diffusion bonding or other fastening techniques. The predefined blade and cover geometries prior can be set with respect to an expected distortion in the airfoil 161 caused by attachment of the airfoil body 168 and cover skin 170 during the attaching step 176G.

In examples, the airfoil body 168 extends from a root section to a tip portion (e.g., root section 64 and tip portion 66 of FIGS. 2-3) to define a stagger angle α (FIG. 5) such that the airfoil body 168 is twisted. The stagger angle α of the airfoil section 162 can include any of the stagger angles α disclosed herein, such as being greater than or equal to 10 degrees, absolute, at the airfoil tip relative to the root section prior to attaching the cover skin 170 at step 176G.

Attaching the cover skin 170 can include trapping an inert gas in each internal cavity 172. In the illustrated example of FIG. 7, the component 160 can be situated in a controlled environment E (shown in dashed lines) prior to and during the attaching step 176G. A fluid source FS (shown in dashed lines) is operable to convey an amount of fluid F to the environment E. Example fluids F include inert gases such as argon or helium. The fluid F circulates in the environment E and is communicated to the internal cavities 172. Attaching the cover skin 170 to the airfoil body 168 can cause an amount of the fluid F to be trapped in the internal cavities 172. In other examples, fluid F is communicated to the internal cavities via passages in the root section (see, e.g., root section 64, cavities 72 and fluid source FS of FIG. 3). Walls of the ribs 174 can include one or more vent holes 175 (shown in dashed lines in FIG. 7) at approximately midpoint within the rib 174, for example, to permit equalization of pressure of the trapped inert gases between adjacent internal cavities 172 during attaching step 176G.

Figure 8:
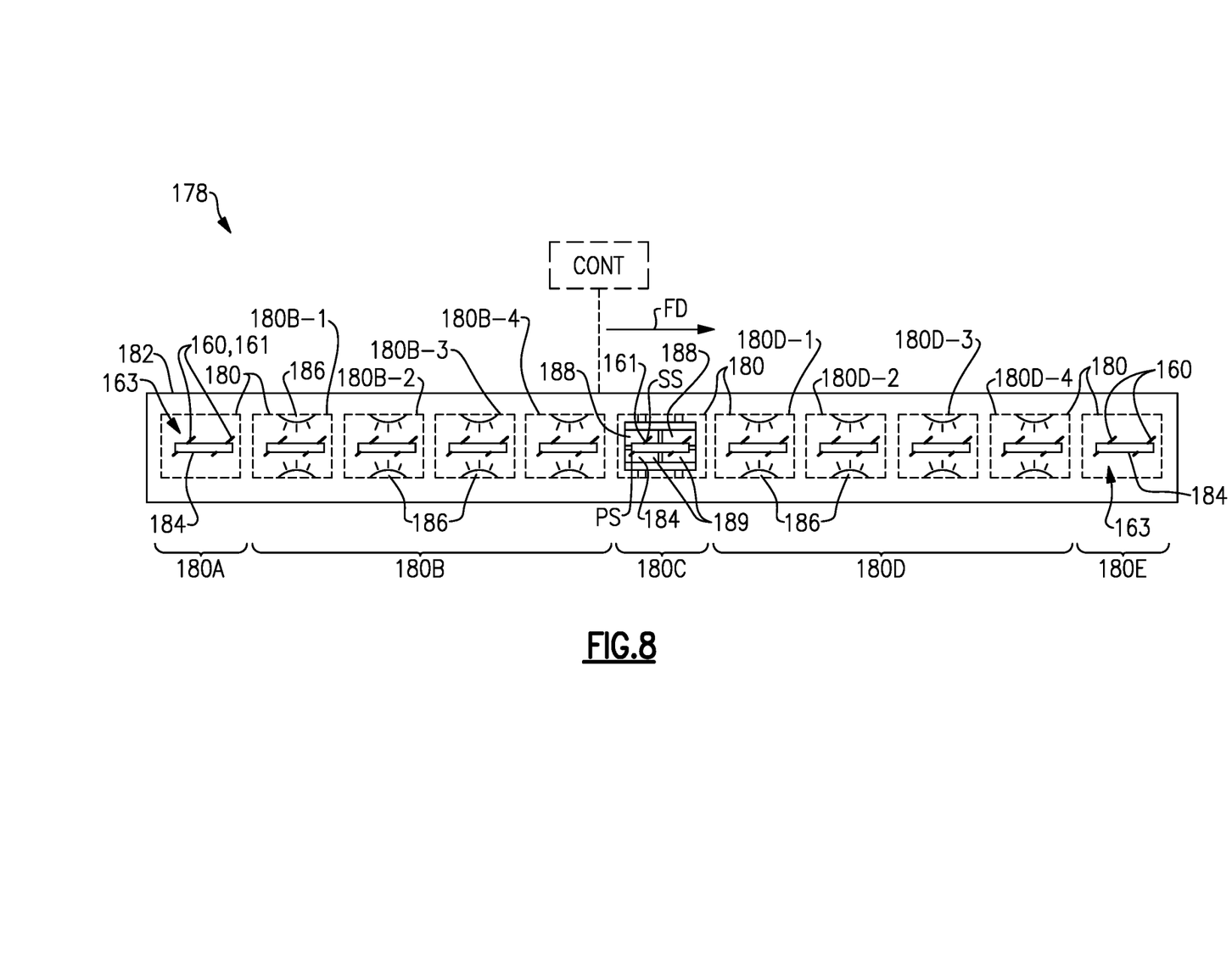
FIG. 8 illustrates a forming line including gas turbine engine components positioned in a plurality of stations.

FIG. 8 illustrates a continuous flow automated forming line 178 that can be utilized with the exemplary process 176 to form the component(s) 160 with respect to a predefined geometry, such as the airfoil section 162 of FIG. 7, for example. However, other components can be utilized according to the teachings disclosed herein, such as vanes and endwalls.

The forming line 178 can be a continuous flow automated line including a plurality of stations 180 (shown in dashed lines). The forming line 178 can include a controller CONT (shown in dashed lines) that is operable to index, move or position the component(s) 160 in and through each of the stations 180 according to a predefined schedule. One would understand how to configure the controller CONT with logic to execute the predefined schedule according to the teachings disclosed herein. It should be appreciated that other techniques for moving the components 160 can be utilized including, but not limited to, manually positioning the components 160 in each station 180. Each of the stations 180 can be separate and distinct from one another.

The stations 180 can include at least a loading station 180A, a set of heating stations 180B, a deforming station 180C, a set of cool down stations 180D, and an unloading station 180E. The loading station 180A is upstream of the heating stations 180B, which are upstream of the deforming station 180C. The deforming station 180C is upstream of the cool down stations 180D, which are upstream of the unloading station 180E. The forming line 178 can include a conveyor 182 moveable in a direction FD to move or position the components 160 in each of the stations 180.

Referring to FIG. 8 with continuing to reference to FIG. 6, at step 176H at least one component 160 such as airfoil 161 is positioned in the forming line 178 at the loading station 180 subsequent to attaching step 176G. The airfoil 161 can be positioned in a root upward orientation as illustrated by the airfoils 161 and respective root sections 164 of FIG. 9, for example. The positioning step 176H can include positioning a plurality of airfoils 161, such as two airfoils 161, at the loading station 180A to move the airfoils 161 together as an airfoil set 163 in each of the stations 180. It should be appreciated that fewer or more than two airfoils 161 can be moved at a time in each of the stations 180. The airfoil set 163 can be positioned in a common support fixture 184. The conveyor 182 can be an overhead conveyer operable to move the airfoil set 163 together with the common support fixture 184 in each of the stations 180.

The components 160 can be enclosed in each of the respective heating, deforming and/or cool down stations 180B, 180C, 180D. Each station 180 can be an "open air" or non-vacuum environment, which can reduce a complexity of forming the components 160. The open air environment can exclude any furnace or protective environment such as a vacuum or argon environment.

The components 160 are moved or positioned in the loading station 180A at a loading temperature. The loading temperature can be above 32 degrees Fahrenheit (F), such as between 50 degrees and 150 degrees Fahrenheit (F). In some examples, the loading temperature can be set to approximately room temperature. For the purposes of this disclosure, the term "room temperature" means a temperature between 68 degrees and 73 degrees Fahrenheit (F) and the term "approximately" means±3% of the value unless otherwise disclosed.

At step 176I, from the loading station 180A each component 160 enters a controlled heating phase including preheating the components 160 to a predetermined temperature prior to positioning the components 160 in the forming station 180C. Step 176I includes positioning the components 160 in the set of heating stations 180B to progressively heat or increase a temperature of the components 160 to a first predetermined temperature threshold.

The set of heating stations 180B can include two or more heating stations 180B arranged in a series. In the illustrated example of FIG. 8, the set of heating stations 180 includes four separate and distinct heating stations 180B-1 in 180B-4 arranged in series. In other examples, the forming line 178 includes only one heating station 180B.

In the illustrated example of FIG. 8, the first heating station 180B-1 is set to a temperature of approximately 300 degrees Fahrenheit (F). The second heating station 180B-2 is set to a temperature of approximately 700 degrees Fahrenheit (F). The third heating station 180B-3 is set to a temperature of approximately 1000 degrees Fahrenheit (F), and the fourth heating station 180B-4 is set to a temperature of approximately 1315 degrees Fahrenheit (F). The components 160 together with the common support fixture 184 are moved or advanced in each of the heating stations 180B in approximately 20-30 minute increments, for example. It should be appreciated that other temperatures and heating durations can be utilized with the teachings disclosed herein.

Various techniques can be utilized to heat the components 160 in each of the heating stations 180B. In the illustrated example of FIG. 8, each heating station 180B includes one or more infrared heating elements 186, such as an array of quartz lamps. Each quartz lamp or other heating element 186 can be independently controllable in its intensity so as to provided uniform temperature over the entire component 160 at each station of forming line 178. The heating elements 186 are oriented towards the components 160 when the components 160 are positioned in the respective heating stations 180B. In some examples, the components 160 together with the support fixture 184 remain substantially stationary in the respective station 180 for a predetermined duration to ensure substantially uniform heating and/or cooling of the components 160. Preheating the component 160 prior to positioning the components 160 in the deforming station 180C can relax or otherwise reduce residual stresses in the component 160 due to attachment of the cover skin 170 to the airfoil body 168 during step 176G. For example, approximately 50% relaxation or movement of the airfoil section 162 toward a target aerodynamic profile can occur in response to the component 160 being positioned in the third heating station 180B-3 for the predetermined duration.

Figure 9:
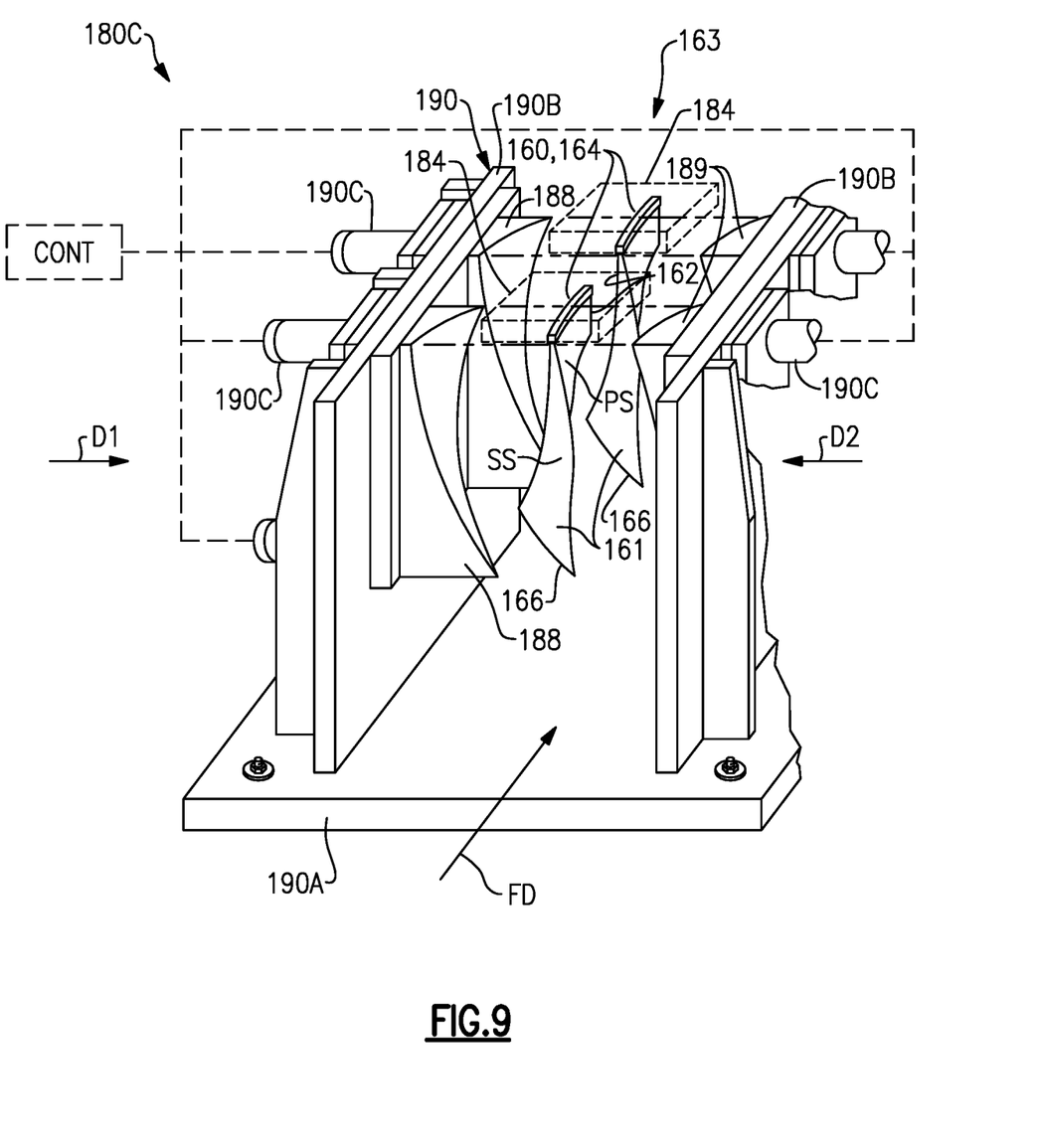
FIG. 9 illustrates a perspective view of the components of FIG. 8 positioned in a deforming station including a set of dies.
Figure 10:
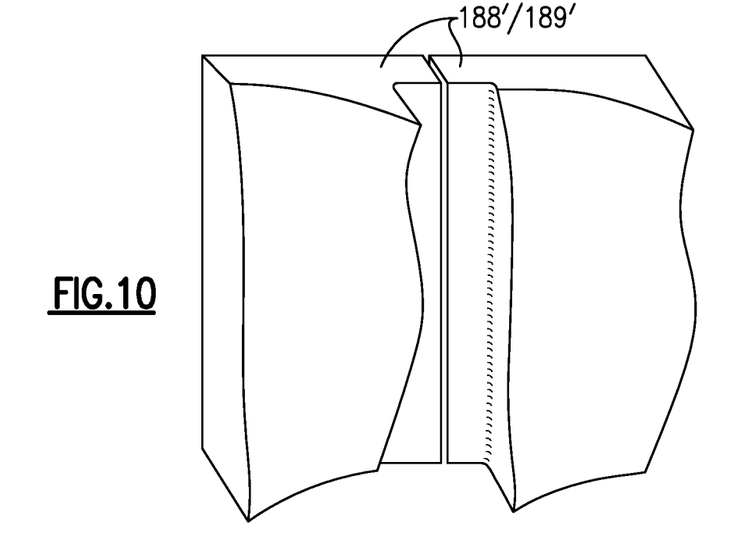
FIG. 10 illustrates a die according to another example.

Referring to FIG. 9 with continuing reference to FIGS. 6 and 8, at step 176J the components 160 are moved from the last heating station 180B-4 to the deforming station 180C. The deforming station 180C includes a deforming machine 190. The deforming machine 190 includes a base 190A mounted to a static structure. The machine 190 includes a pair of supports 190B extending from the base 190A. The airfoils 161 can be suspended or otherwise supported by respective root sections 164 in the common support fixture 184 (shown in dashed lines) residing above deforming machine 190 such that the airfoils 161 are oriented substantially vertically between the dies 188, 189 with tip portions 166 positioned downward or otherwise below respective root section 164 as illustrated by FIG. 9. Vertically orienting the airfoils 161 by hanging or suspending the airfoils 161 by the respective root sections 164 can reduce spanwise distortions such as buckling during heating and cooling and relation of the airfoils 161.

The common support fixture 184 is moved in direction FD to position each airfoil section 162 between respective a set of first and second dies (or die halves) 188, 189. The dies 188, 189 are contoured to mate with pressure and suction sides PS, SS of the respective airfoil section 162 of the airfoil 161. In the illustrative example of FIG. 10, each of the dies is a split die 188'/189' to facilitate replacement of portions of the die 188'/189'.

The deforming station 180C is operable to cause the airfoil section 162 of each airfoil 161 to deform or resize between the first and second dies 188, 189. The machine 190 includes one or more actuators 190C that are operable to move the dies 188, 189 in response to signal(s) from controller CONT (shown in dashed lines). Movement of the dies 188, 189 includes exerting a pressure on surfaces of the airfoil section 162 sufficient to cause a predetermined amount of deformation to occur.

The dies 188, 189 are operable to heat the components 160 to a second predetermined temperature threshold prior to and during holding the components 160 under compression by applying pressure from the actuators 190C. For example, the dies 188, 189 can be heated to and continuously operating at a temperature of at least 1200 degrees Fahrenheit (F), or more narrowly between approximately 1300 and 1600 degrees Fahrenheit (F). In some examples, the second temperature threshold or range is equal to or greater than the first temperature threshold or range of the set of heating stations 180B.

Each component 160 is preheated to the first temperature threshold subsequent to the attaching step 176G and prior to abutment with the dies 188, 189. For example, the temperature of the component 160 can be at least 90% of a surface temperature of the dies 188, 189, or more narrowly between 95% and 105% of the surface temperature, when the component 160 is initially positioned in the deforming station 180C between, but prior to abutment with, the dies 188, 189.

In the illustrative example of FIG. 8, the temperature of the components 160 in at least one of the heating stations 180B is greater than a temperature of the first and second dies 188, 189. The second temperature threshold is less than the first temperature threshold or range such that a temperature of the components 160 is reduced subsequent to moving from the set of heat stations 180B. A reduction of temperature may occur due to transit between the heating station 180B-4 and the deforming station 180C.

For example, the dies 188, 189 are operable to heat the respective component 160 to a temperature of approximately 1300 degrees Fahrenheit (F). The fourth heating station 180B-4 can be set to a temperature of approximately 1315 Fahrenheit (F). In other examples, the temperature of the component 160 exiting the fourth heating station 180B-4 is less than the temperature of the first and second dies 188, 189 when the respective component 160 is moved to the deforming station 180C.

Figure 11:
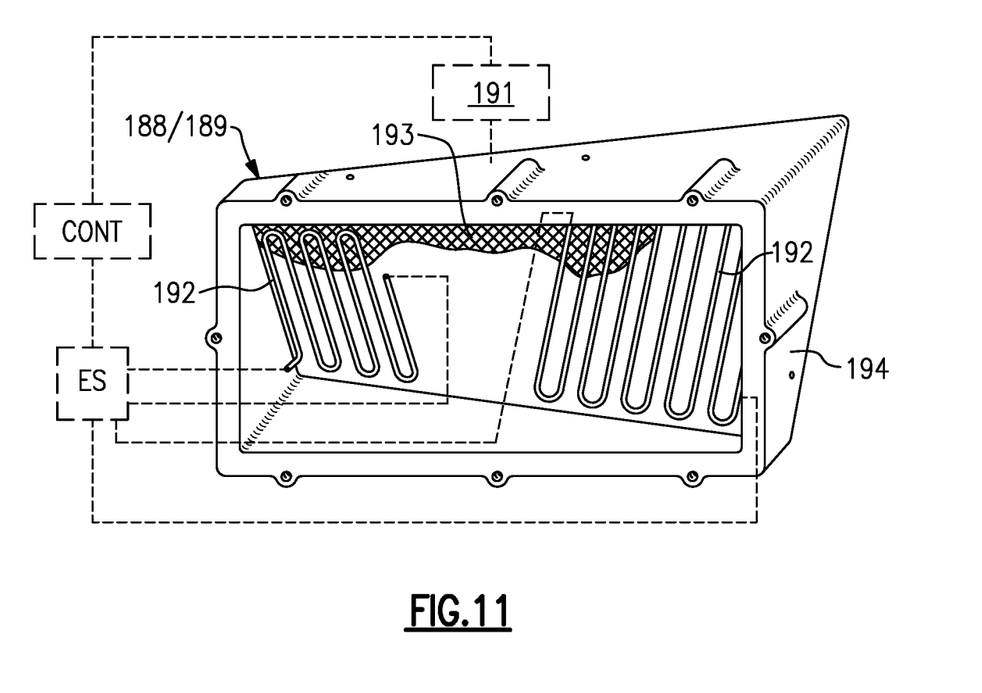
FIG. 11 illustrates a perspective view of one of the dies of FIG. 9.

FIG. 11 illustrates a backside of a refined version one of the dies 188/189. Each of the die 188/189 can include one or more heating elements 192 that are positioned in a backside cavity of the die 188/189. Each die 188/189 can be made of metal or a metal alloy, such as a cast nickel alloy which can improve the ability of continuously operating the dies 188, 189 at the second predefined temperature threshold.

Each heating element 192 can be a heating coil that is coupled to an energy source ES (shown in dashed lines). The energy source ES can be a power supply operable to communicate electrical current to the heating element 192 in response to controller CONT to heat the respective die 188/189 to the second temperature threshold. The controller CONT can be coupled to at least one sensor 191 (shown in dashed lines), such as a thermocouple, to monitor surface temperatures of the respective die 188/189. The controller CONT is operable to adjust the temperature of the die 188/189 to maintain or otherwise approach the second temperature threshold.

A non-metallic heat conductive layer 193 such as cloth can be situated between the heating elements 192 and surfaces of the die 188/189 to reduce a likelihood of arcing. At least one coating 194 can be deposited on surfaces of the die 188/189. Example coatings include diffused aluminide which can provide oxidation protection.

Referring to FIGS. 6 and 8-9, at step 176J the component 160 undergoes permanent deformation to vary a geometry of the walls 171 of the airfoil body 168 and/or cover skin 170 (FIG. 7). Step 176J includes moving the first and second dies 188, 189 in opposed directions D1, D2 (FIG. 9) towards and into abutment with respective ones of the pressure and suction sides PS, SS of the respective airfoil section 162, as illustrated by FIGS. 8 and 9.

Each airfoil section 162 is clamped or held in compression between respective dies 188, 189 at or approximately the second temperature threshold for a predetermined duration, such as approximately 20-30 minutes, to cause the airfoil section 162 to permanently deform between the dies 188, 189. The predetermined duration can be set to cause the airfoil section 162 to undergo creep deformation or hot sizing, to minimize or otherwise reduce the residual stresses in the component 160 that may be caused during the attaching step 176G, and to allow the walls 171 to conform to the surface profile of the dies 188, 189. In some examples, the deformation of the airfoil section 162 occurs such that a change in the stagger angle α (see FIG. 5) of the of airfoil 162 that is presented to the deforming station 180C is no more than 1 or 2 degrees, absolute, at the tip portion relative to the root section. The deformation due to hot sizing the component 160 can be less than about 0.1 inches, for example.

The dies 188, 189 can serve as "gas sizing" dies that are utilized to cause at least a portion of the component 160 to undergo deformation. Creep deformation, hot sizing and gas sizing are generally known. However, utilization of such techniques to form the components in situ as disclosed herein are not known. For example, heating of the fluid F trapped in the internal cavities 172 (FIG. 7) of the component 160 during the attaching step 176G causes the internal cavities 172 to pressurize and the walls 171 of the airfoil section 162 to move outwardly or otherwise deform during the deforming step 176J.

Referring to FIGS. 6 and 8, at step 176K each component 160 enters a controlled cool down phase subsequent to the deforming step 176J. The components 160 are moved in the set of cool down stations 180D to progressively decrease the temperature of each component 160. The set of cool down stations 180D can include two or more cool down stations 180D arranged in a series. In the illustrated example of FIG. 8, the set of cool down stations 180 includes four separate and distinct cool down stations 180D-1 through 180D-4 arranged in series. In other examples, the forming line 178 includes only one cool down station 180D. The controlled cool down phase can reduce residual stresses that may otherwise be reintroduced in the component 160 were the component 160 to otherwise be moved directly from the deforming station 180C to the unloading station 180E at room temperature.

Various techniques can be utilized to cool down the components 160 in each of the cool down stations 180D. In the illustrated example of FIG. 8, each cool down station 180D includes one or more infrared heating elements 186 oriented towards the components 160 when the components 160 are positioned in the cool down stations 180D.

In the illustrated example of FIG. 8, the first cool down station 180D-1 is set to a temperature of approximately 1000 degrees Fahrenheit (F). The second cool down station 180D-2 is set to a temperature of approximately 700 degrees Fahrenheit (F). The third cool down station 180D-3 is set to a temperature of approximately 300 degrees Fahrenheit (F), and the fourth cool down station 180D-4 is set to a temperature of between 50 degrees and 150 degrees Fahrenheit (F), such as approximately room temperature. The components 160 together with the common support fixture 184 are moved in each of the cool down stations 180D in approximately 20-30 minute increments, for example. It should be appreciated that other temperatures and cool down durations can be utilized with the teachings disclosed herein. At step 176L, the components 160 are unloaded from the forming line 178 at an unloading temperature. The unloading temperature can be above 32 degrees Fahrenheit (F), such as between 50 degrees and 150 degrees Fahrenheit (F), or more narrowly approximately room temperature, for example. The components 160 can be loaded into the support fixture 184 at the loading station 180A and unloaded from the support fixture 184 at the unloading station 180E utilizing various techniques, such as by a robot or manually.

One or more finishing steps can be performed subsequent to unloading the components 160 at step 176L. For example, an interior inspection of the component 160 can occur at step 176M. One or more final machining operations of the component 160 can occur at step 176N. A final inspection of the component 160 can occur at step 176O.

The process and forming line disclosed herein can be utilized to rapidly dimensionally correct the components subsequent to welding or otherwise attaching the various components. The process can be performed in an open air environment, which can reduce complexity.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of forming a gas turbine engine component comprising:
   welding a cover skin to an airfoil body to define an airfoil, the airfoil body extending from a root section to a tip portion to define a stagger angle such that the airfoil body is twisted;
   moving the airfoil in a forming line subsequent to the welding step, the forming line including a set of heating stations and a deforming station; and
   wherein the moving step includes positioning the airfoil in the set of heating stations to progressively increase a temperature of the airfoil, and then positioning the airfoil in the deforming station including causing the airfoil to deform between first and second dies.

2. The method as recited in claim 1, wherein:
   wherein the airfoil body extends from a root section to a tip portion, the tip portion defines a stagger angle relative to the root section, and the stagger angle is greater than or equal to 10 degrees, absolute, prior to the welding step; and
   the step of causing the airfoil to deform between the first and second dies occurs such that a change in the stagger angle of the airfoil presented to the deforming station is no more than 1 degree, absolute.

3. The method as recited in claim 1, further comprising forming a plurality of internal cavities in the airfoil body, and wherein the welding step includes trapping an inert gas in the plurality of internal cavities.

4. A method as recited in claim 1, wherein the forming line includes a set of cool down stations, and wherein the moving step includes positioning the airfoil in the set of cool down stations to progressively decrease the temperature of the airfoil subsequent to the step of positioning the airfoil in the deforming station.

5. A method of forming a gas turbine engine component comprising:
   attaching a cover skin to an airfoil body, the airfoil body and the cover skin cooperating to define pressure and suction sides of an airfoil;
   moving the airfoil in a forming line including a plurality of stations, the plurality of stations including a set of heating stations, a deforming station and a set of cool down stations; and
   wherein the moving step includes positioning the airfoil in the set of heating stations to progressively increase a temperature of the airfoil, then positioning the airfoil in the deforming station including causing the airfoil to deform between first and second dies, and then positioning the airfoil in the set of cool down stations to progressively decrease the temperature of the airfoil.

6. The method as recited in claim 5, wherein the attaching step includes welding at least a perimeter of the cover skin to the airfoil body.

7. The method as recited in claim 6, wherein the cover skin is dimensioned to enclose at least one internal cavity in the airfoil body, and the attaching step includes trapping an inert gas in the at least one internal cavity.

8. The method as recited in claim 7, wherein the inert gas comprises argon.

9. The method as recited in claim 5, wherein the set of heating stations includes two or more heating stations arranged in series.

10. The method as recited in claim 9, wherein the temperature of the airfoil in at least one heating station of the set of heating stations is greater than a temperature of the first and second dies.

11. The method as recited in claim 5, wherein the step of positioning the airfoil in the deforming station includes moving the first and second dies towards and into abutment with respective ones of the pressure and suction sides.

12. The method as recited in claim 11, wherein the step of positioning the airfoil in the deforming station includes heating the first and second dies to a temperature of at least 1200 degrees Fahrenheit.

13. The method as recited in claim 5, wherein the airfoil body extends from a root section to a tip portion, the tip portion defines a stagger angle relative to the root section, and the stagger angle is greater than or equal to 10 degrees, absolute, prior to the attaching step.

14. The method as recited in claim 13, wherein the step of causing the airfoil to deform occurs such that a change in the stagger angle of the airfoil presented to the deforming station is no more than 2 degrees, absolute.

15. The method as recited in claim 5, wherein the airfoil includes a plurality of airfoils, and the moving step includes moving the plurality of airfoils together as an airfoil set in each of the plurality of stations.

16. The method as recited in claim 15, further comprising positioning the airfoil set in a common support fixture, and wherein the moving step includes moving the common support fixture together with the airfoil set in the plurality of stations.

17. The method as recited in claim 5, wherein the airfoil is a fan blade.

18. The method as recited in claim 5, wherein the airfoil is metallic.

19. The method as recited in claim 5, wherein each heating station of the set of heating stations includes one or more infrared heating elements.

20. The method as recited in claim 5, wherein the forming line includes a loading station upstream of the set of heating stations, and further comprising positioning the airfoil in the loading station at a loading temperature between 50 degrees and 150 degrees Fahrenheit.

* * * * *